(12) United States Patent
van Kampen et al.

(10) Patent No.: US 7,551,592 B2
(45) Date of Patent: Jun. 23, 2009

(54) POWER MANAGEMENT METHOD FOR CREATING DELIVER OPPORTUNITIES IN A WIRELESS COMMUNICATION SYSTEM

(75) Inventors: Harald van Kampen, Utrecht (NL); Leo Monteban, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 911 days.

(21) Appl. No.: 10/743,595

(22) Filed: Dec. 22, 2003

(65) Prior Publication Data

US 2005/0136914 A1 Jun. 23, 2005

(51) Int. Cl.
*H04W 4/00* (2009.01)
(52) U.S. Cl. .................................................... 370/338
(58) Field of Classification Search ................ 370/338, 370/392, 311; 340/7.32, 7.38; 450/341.3–341.6
See application file for complete search history.

(56) References Cited

U.S. PATENT DOCUMENTS

| | | | |
|---|---|---|---|
| 6,067,297 A | 5/2000 | Beach | |
| 6,192,230 B1 | 2/2001 | van Bokhorst et al. | 455/343.3 |
| 6,463,307 B1 | 10/2002 | Larsson et al. | |
| 6,564,074 B2 | 5/2003 | Romans | |
| 6,622,251 B1 * | 9/2003 | Lindskog et al. | 713/300 |
| 7,161,951 B1 * | 1/2007 | Sherman | 370/447 |
| 2002/0019215 A1 * | 2/2002 | Romans | 455/69 |
| 2002/0071449 A1 * | 6/2002 | Ho et al. | 370/447 |
| 2002/0132603 A1 * | 9/2002 | Lindskog et al. | 455/343 |
| 2003/0185241 A1 * | 10/2003 | Lu et al. | 370/476 |
| 2005/0018624 A1 * | 1/2005 | Meier et al. | 370/318 |
| 2005/0047357 A1 | 3/2005 | Benveniste | 370/311 |
| 2005/0138451 A1 * | 6/2005 | Simpson et al. | 713/320 |
| 2006/0193296 A1 | 8/2006 | Zhong et al. | |

OTHER PUBLICATIONS

"Proposed Normative Text for Simplified APSD," by Mathilde Benveniste, Keith Amann, and Bob Meier, IEEE 802.11-03/107r0, Jan. 2003, pp. 1-4.

"Proposed Normative Text for Simplified APSD," by Mathilde Benveniste, Keith Amann, and Bob Meier, IEEE 802.11-03/107r0, Jan. 2003, pp. 1-4.

"Proposed Normative Text for Simplified APSD," by Mathilde Benveniste and Keith Amann, IEEE 802.11-03/107r0, May 2003, pp. 1-4.

* cited by examiner

*Primary Examiner*—Hanh Nguyen
*Assistant Examiner*—Juvena Loo
(74) *Attorney, Agent, or Firm*—Mendelsohn, Drucker & Associates, P.C.; Yuri Gruzdkov; Steve Mendelsohn

(57) ABSTRACT

A power management method, in which creation of deliver opportunities for a wireless station (STA) of a WLAN system is managed using a designated sub-field of the frame control field in a MAC header. In one embodiment, the STA is adapted (i) to use the power management sub-field to communicate its power state to the access point (AP) and (ii) to run a periodicity timer, which starts when the STA has transitioned to the doze state. The STA transitions to the awake state either when it has a data frame available for transmission to the AP or when the periodicity timer runs out. In another embodiment, the AP and STA create deliver opportunities by entering a new mode of operation referred to as interactive traffic power management (ITPM) mode, during which the power management sub-field is ignored and the more data sub-field is used to communicate the power state and manage transitions of the STA between the awake and doze states. Embodiments of the invention improve WLAN system performance when the traffic load is such that data frames become available for transmission both at the STA and AP at relatively regular intervals, which is typically the case for interactive voice-over-WLAN applications.

15 Claims, 4 Drawing Sheets

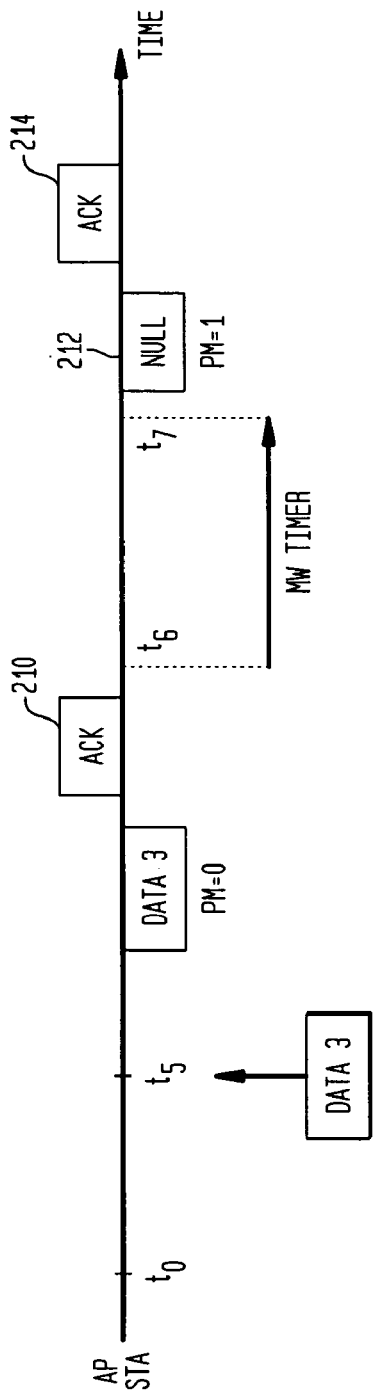
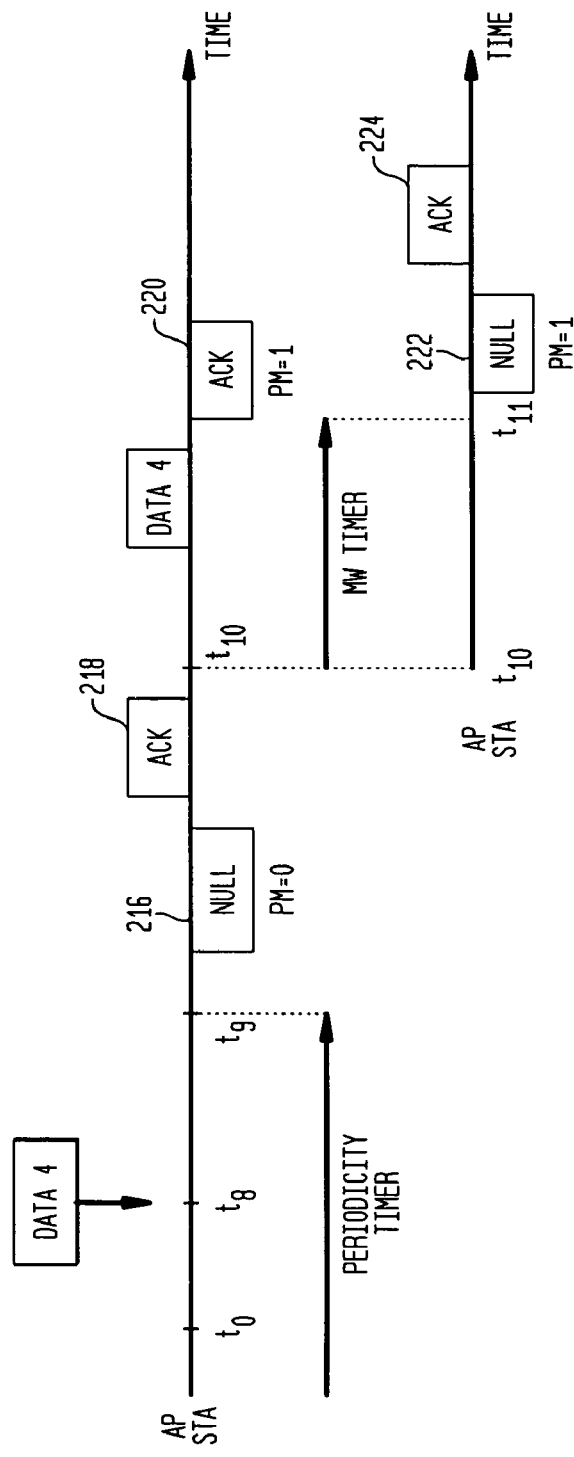

POWER MANAGEMENT METHOD FOR CREATING DELIVER OPPORTUNITIES IN A WIRELESS COMMUNICATION SYSTEM

CROSS REFERENCE TO RELATED APPLICATIONS

This application is one of a set of U.S. patent applications consisting of Ser. No. 10/743,595 and Ser. No. 10/743,243, both of which were filed on the same date and the teachings of which are incorporated herein by reference.

BACKGROUND OF THE INVENTION

1. Field of the Invention

The present invention relates to communication equipment and, more specifically, to equipment for wireless local area networks (WLANs).

2. Description of the Related Art

IEEE Standard 802.11, the teachings of which are incorporated herein by reference, has emerged as a prevailing technology for broadband access in WLAN systems and is regarded by many as a wireless version of Ethernet. The 802.11 medium access control (MAC) specifications provide that a wireless station (STA) may be in one of two power states: awake state and doze state. In the awake state, the STA is fully powered and is able to transmit and receive frames. In contrast, in the doze state, the STA consumes very low power and is not able to transmit or receive. The manner in which an STA transitions between these two states is determined by the STA power management mode. The 802.11 MAC specifications define two power management modes: active mode and power save (PS) mode. In active mode, the STA is always awake and therefore consumes substantial power. In PS mode, the STA is in the awake state only for relatively short periods of time while spending the remaining time in the doze state, which significantly reduces the amount of consumed power.

According to the 802.11 standard, a WLAN system having one or more STAs functioning in PS mode may operate as follows. The access point (AP) of the WLAN does not arbitrarily transmit frames to said STAs, but buffers the frames and transmits them at designated times. The AP identifies the STAs, for which the AP currently has frames, in a traffic indication map (TIM) provided with a beacon. With knowledge of beacon schedule, each STA functioning in PS mode awakes for beacons and determines by interpreting the TIM whether the AP has a buffered frame for that STA. Upon determining that the AP currently has a buffered frame, the STA transmits a PS-Poll frame indicating that it is awake and is ready to receive. In response, the AP may either transmit the buffered frame immediately or acknowledge receipt of the PS-Poll frame and transmit the buffered frame at a later time. The STA remains in the awake state to await the frame transmission.

One problem with the above-described operating method is that it typically creates a transmission overhead of one PS-Poll frame per each buffered frame. As a result, an application employing relatively small data frames exchanged with relatively high periodicity, e.g., interactive voice over WLAN, will create a disadvantageously large transmission overhead. Another problem is that the delivery of buffered frames tends to be concentrated around beacons, which creates congestion, thereby increasing the number of collisions and reducing effective channel capacity.

SUMMARY OF THE INVENTION

Problems in the prior art are addressed, in accordance with the principles of the present invention, by a power management method, in which creation of deliver opportunities for a wireless station (STA) of a WLAN system is managed using a designated sub-field of the frame control field in a MAC header. In one embodiment, the STA is adapted (i) to use the power management sub-field to communicate its power state to the access point (AP) and (ii) to run a periodicity timer, which starts when the STA has transitioned to the doze state. The STA transitions to the awake state either when it has a data frame available for transmission to the AP or when the periodicity timer runs out. In another embodiment, the AP and STA create deliver opportunities by entering a new mode of operation referred to as interactive traffic power management (ITPM) mode, during which the power management sub-field is ignored and the more data sub-field is used to communicate the power state and manage transitions of the STA between the awake and doze states. Embodiments of the invention improve WLAN system performance when the traffic load is such that data frames become available for transmission both at the STA and AP at relatively regular intervals, which is typically the case for interactive voice-over-WLAN applications. Advantageously, the traffic load is spread away from beacons, which alleviates congestion. In addition, both upstream and downstream frames can be transmitted using the same deliver opportunity, which reduces the transmission overhead.

According to one embodiment, the present invention is, at a station of a contention-based WLAN system in which the station is adapted to operate in awake and doze states, a method comprising: (A) with the station in the doze state, transitioning the station from the doze state to the awake state; and (B) transmitting to an access point (AP) of the system a first frame, wherein a designated bit in the first frame informs the AP that the station will remain in the awake state and be available to receive at least one transmission from the AP.

According to another embodiment, the present invention is, at an access point (AP) of a contention-based WLAN system in which a station is adapted to operate in awake and doze states, a method comprising: (A) receiving from the station a first frame, wherein a designated bit in the first frame informs the AP that the station will remain in the awake state and be available to receive at least one transmission from the AP; and (B) transmitting to the station an acknowledgement frame corresponding to the first frame, wherein a designated bit in the acknowledgement frame informs the station whether the AP has data to transmit to the station.

BRIEF DESCRIPTION OF THE DRAWINGS

Other aspects, features, and benefits of the present invention will become more fully apparent from the following detailed description, the appended claims, and the accompanying drawings in which:

FIGS. 2A-C graphically show how the power management (PM) bit of a MAC header is used to manage transmissions between an AP and an STA according to one embodiment of the present invention;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Each MAC frame in an 802.11-compliant WLAN comprises a set of fields that occur in a fixed order in each frame. Generally, the following three basic frame components are distinguished: a MAC header, a frame body, and a frame check sequence (FCS). A MAC header contains frame control, duration, address, and sequence control information; a variable-length frame body contains information specific to the frame type; and an FCS contains an IEEE 32-bit cyclic redundancy code.

Figure 1:
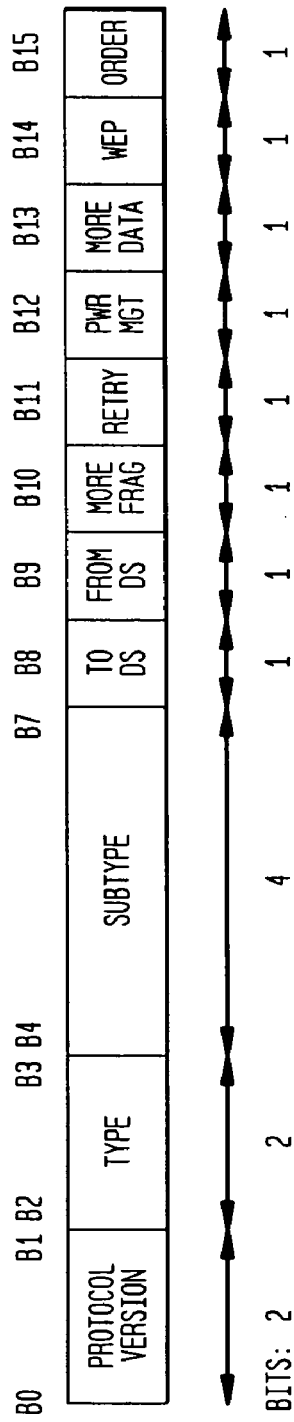
FIG. 1 shows schematically the structure of the frame control field in a MAC header.

FIG. 1 shows schematically the structure of the frame control field in a MAC header. More specifically, the frame control field has the following sub-fields: Protocol Version (bits B0-B1); Type (bits B2-B3); Subtype (bits B4-B7); To Distribution System (bit B8); From Distribution System (bit B9); More Fragments (bit B10); Retry (bit B11); Power Management (bit B12); More Data (bit B13); Wired Equivalent Privacy (bit B14); and Order (bit B16). Of interest to this specification are the Power Management (PM) and More Data (MD) sub-fields (bits), the usage of which is explained in more detail below.

According to the 802.11 standard, the PM bit is used to indicate the mode that an STA will be in after the successful completion of the frame exchange sequence. PM bit values of 1 and 0 indicate that the STA will be in PS mode and active mode, respectively. The PM bit value is always set to 0 in frames transmitted by the AP. The MD bit is used to indicate to an STA in PS mode that one or more frames are buffered at the AP for transmission to that STA. More specifically, an MD bit value of 1 indicates that at least one frame is available for transmission to the STA; and an MD bit value of 0 indicates that there are no buffered frames. The use of the MD bit in frames transmitted from STA to AP is not currently defined in the 802.11 standard.

Figure 2A:
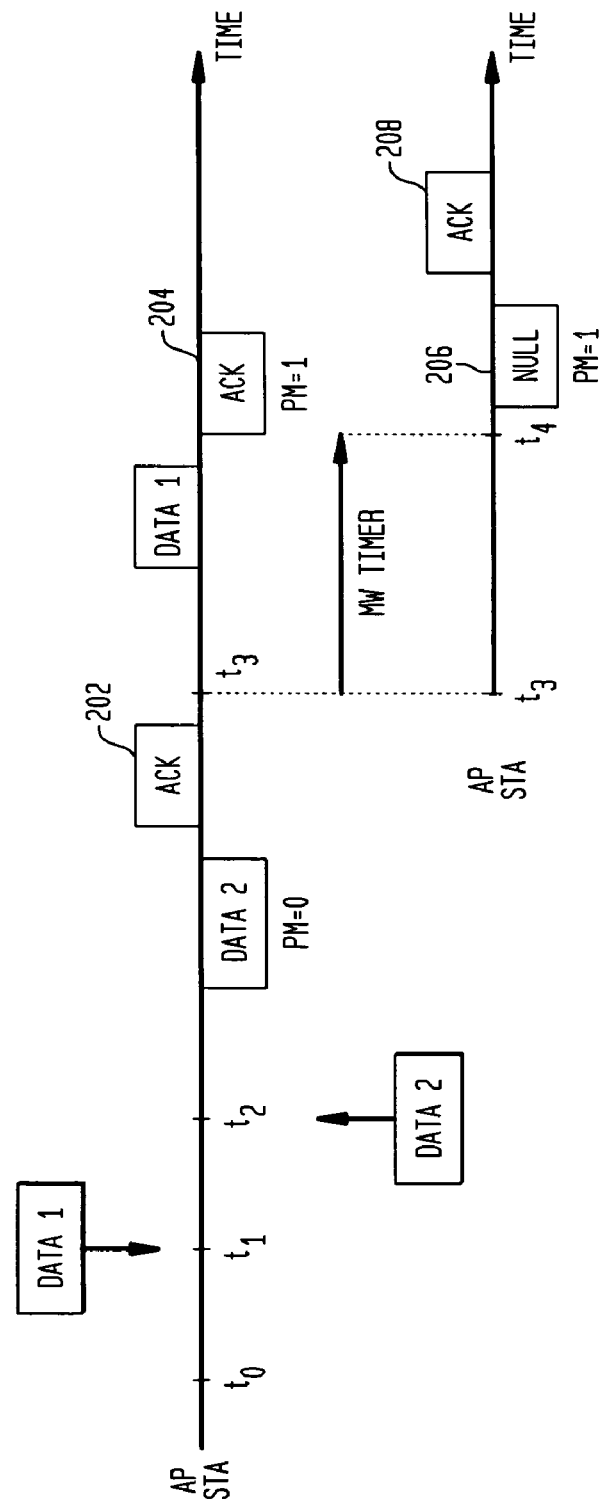

FIGS. 2A-C graphically show how the PM bit is used to manage transmissions between an AP and an STA according to one embodiment of the present invention. More specifically, instead of or in addition to using PS-Poll frames to create deliver opportunities for the AP, the STA creates deliver opportunities using the PM bit of regular data and/or control frames exchanged with the AP, where the term "deliver opportunity" refers to a condition existing when (i) the STA is awake and (ii) the AP has been notified that the STA is awake, which creates an opportunity for the AP to deliver to the STA any buffered frames it might have for that STA. Since such creation of deliver opportunities is correlated with the amount of traffic exchanged between the STA and AP, more than one deliver opportunity may be presented to the AP during a single inter-beacon period. This spreads the traffic load away from beacons and therefore alleviates congestion. In addition, the above-mentioned PS-Poll overhead is reduced.

In one embodiment, the STA is configured to run one or more timers regulating transitions of said STA between the doze and awake states. For example, a first timer, hereafter referred to as the maximum-wait (MW) timer, starts when the AP has been notified that the STA transitioned to the awake state. When the MW timer reaches a selected threshold value (i.e. runs out), the STA notifies the AP and transitions back to the doze state. Similarly, a second timer, hereafter referred to as the periodicity timer, starts when the STA transitions to the doze state. When the periodicity timer runs out, the STA transitions to the awake state and notifies the AP that it is now awake. In one configuration, the first and second timer threshold values are selected and/or adjusted based on the characteristics of traffic between the STA and AP. For example, such characteristics may include data flow rate (i.e., amount of data presented for transmission per unit time), data fragmentation, fluctuations of the flow rate, etc.

FIG. 2A shows a representative frame exchange when both the AP and the STA have data frames available for transmission. Suppose that prior to time t0 the AP has been notified that the STA is in the doze state. When at time t1>t0 frame Data 1 becomes available for transmission from the AP to the STA, the AP queues that frame in a buffer without attempting to transmit it to the STA. When at time t2>t1 frame Data 2 becomes available for transmission from the STA to the AP, the STA transitions to the awake state and proceeds to transmit frame Data 2 with the PM bit in its header set to 0. The AP acknowledges receipt of frame Data 2 with an ACK frame 202 and is now notified that the STA is awake. Upon receipt of ACK frame 202, the STA starts the MW timer at time t3.

The upper time axis in FIG. 2A illustrates a first scenario, in which, before the MW timer runs out, the AP transmits frame Data 1. Accordingly, the STA acknowledges receipt of frame Data 1 with an ACK frame 204 having its PM bit set to 1, transitions to the doze state, and starts the periodicity timer. The lower time axis in FIG. 2A illustrates a second scenario, in which the MW timer has run out before frame Data 1 is transmitted. This may occur, for example, due to the transmission medium being busy or traffic to other STAs having higher priority than the traffic to this particular STA. When the MW timer runs out at time t4, the STA sends a Null frame 206 having its PM bit set to 1. After the AP acknowledges receipt of frame 206 with an ACK frame 208, the STA transitions to the doze state and starts the periodicity timer.

FIG. 2B shows a representative frame exchange when only the STA has data frames available for transmission. Similar to the situation illustrated in FIG. 2A, prior to time t0 the AP has been notified that the STA is in the doze state. When at time t5>t0 frame Data 3 becomes available for transmission from the STA to the AP, the STA transitions to the awake state and proceeds to transmit frame Data 3 with the PM bit in its header set to 0. The AP acknowledges receipt of frame Data 3 with an ACK frame 210 and is now notified that the STA is awake. Upon receipt of ACK frame 210, the STA starts the MW timer at time t6. However, since the AP has no data to transmit to the STA, the MW timer runs out at time t7, which triggers the transmission of a Null frame 212 having its PM bit set to 1. After the AP acknowledges receipt of frame 212 with an ACK frame 214, the STA transitions to the doze state and starts the periodicity timer.

FIG. 2C shows a representative frame exchange when only the AP has data frames available for transmission. Similar to the situations illustrated in FIGS. 2A-B, prior to time t0 the AP has been notified that the STA is in the doze state. When at time t8>t0 frame Data 4 becomes available for transmission from the AP to the STA, the AP queues that frame in a buffer without attempting to transmit it to the STA. Since the STA has no frames to transmit, it will remain in the doze state until the periodicity timer runs out at time t9>t8. At that point, the STA awakes and transmits a Null frame 216 having its PM bit set to 0, which notifies the AP that the STA is now in the awake state. After the AP acknowledges receipt of frame 216 with an ACK frame 218, the STA starts the MW timer at time t10.

Subsequent events shown in FIG. 2C are similar to those shown in FIG. 2A after time t3. More specifically, the upper time axis in FIG. 2C illustrates the scenario in which the AP transmits frame Data 4 before the MW timer runs out. Accordingly, the STA acknowledges receipt of frame Data 4 with an ACK frame 220 having its PM bit set to 1, transitions to the doze state, and starts the periodicity timer. Similarly, the lower time axis in FIG. 2C illustrates the scenario in which the MW timer has run out at time t11 before frame Data 4 could be transmitted. Accordingly, the STA transmits a Null frame 222 having its PM bit set to 1. After the AP acknowledges receipt of frame 222 with an ACK frame 224, the STA transitions to the doze state and starts the periodicity timer.

Embodiments of the power management method illustrated in FIGS. 2A-C are particularly advantageous when the traffic load is such that, for every deliver opportunity, there is at least one frame available for upstream and downstream transmissions (e.g., the situation shown in FIG. 2A). In this case, one exchange can combine both transmissions without incurring the overhead of PS-Poll frames. Some overhead of Null frames may be incurred when either the AP or STA does not have an available frame (e.g., FIGS. 2B-C). Embodiments of the method illustrated by FIGS. 2A-C are also advantageous when frames become available for transmission with periodicity smaller than the beacon periodicity. In that case, buffer delays are reduced due to the presence of additional deliver opportunities between beacons. Furthermore, since the STA controls creation of deliver opportunities, frame processing at the AP can be implemented without departing from that specified in the 802.11 standard. This makes it possible for a WLAN system to have, without compatibility issues, prior art STAs alongside with STAs configured in accordance with embodiments of the method of FIGS. 2A-C.

Figure 3A:
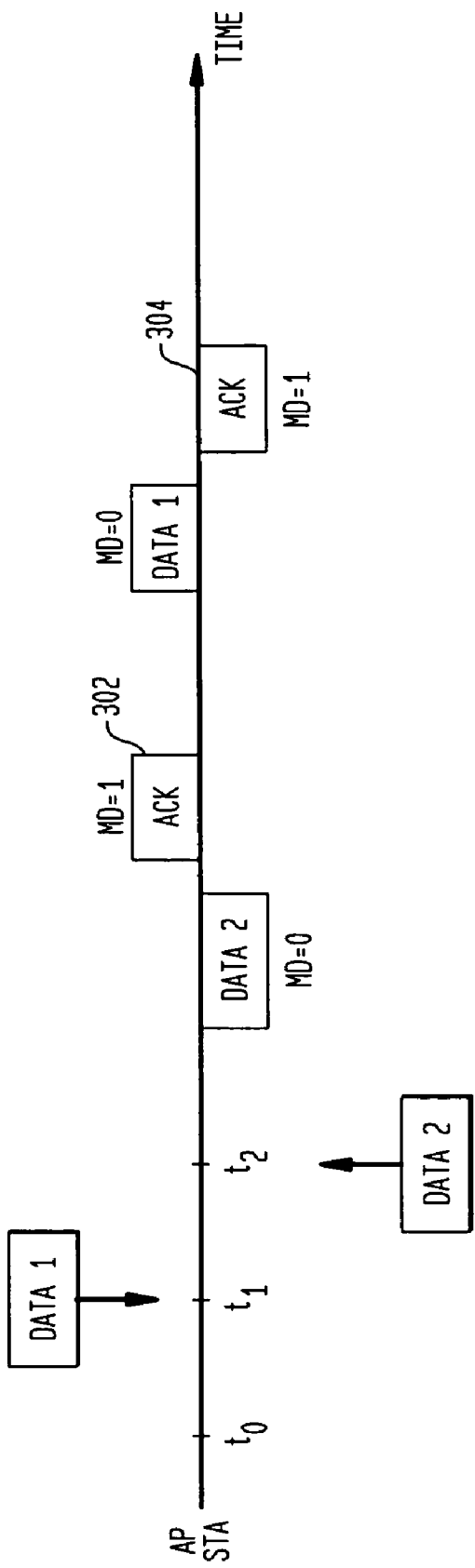
FIGS. 3A-C graphically show how the more data (MD) bit of a MAC header is used to manage transmissions between an AP and an STA according to another embodiment of the present invention.
Figure 3B:
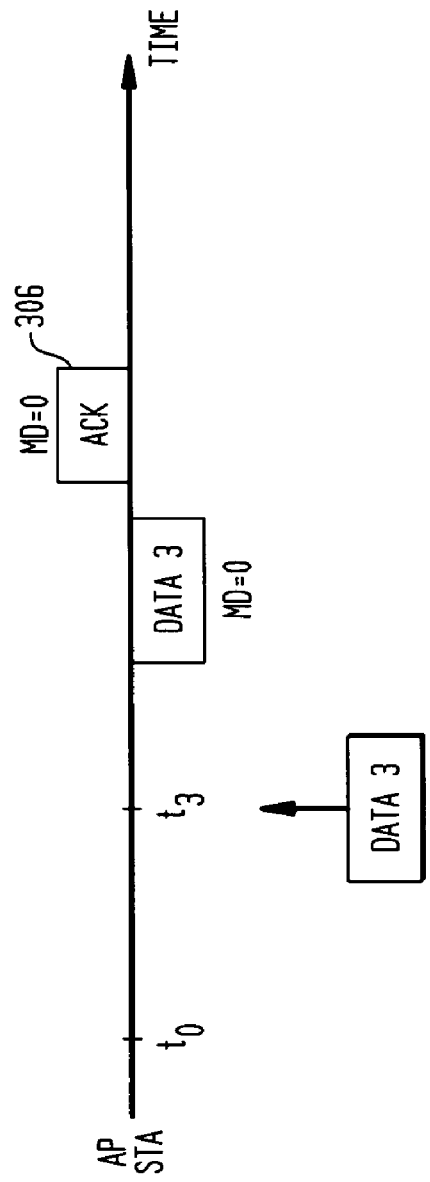
Figure 3C:
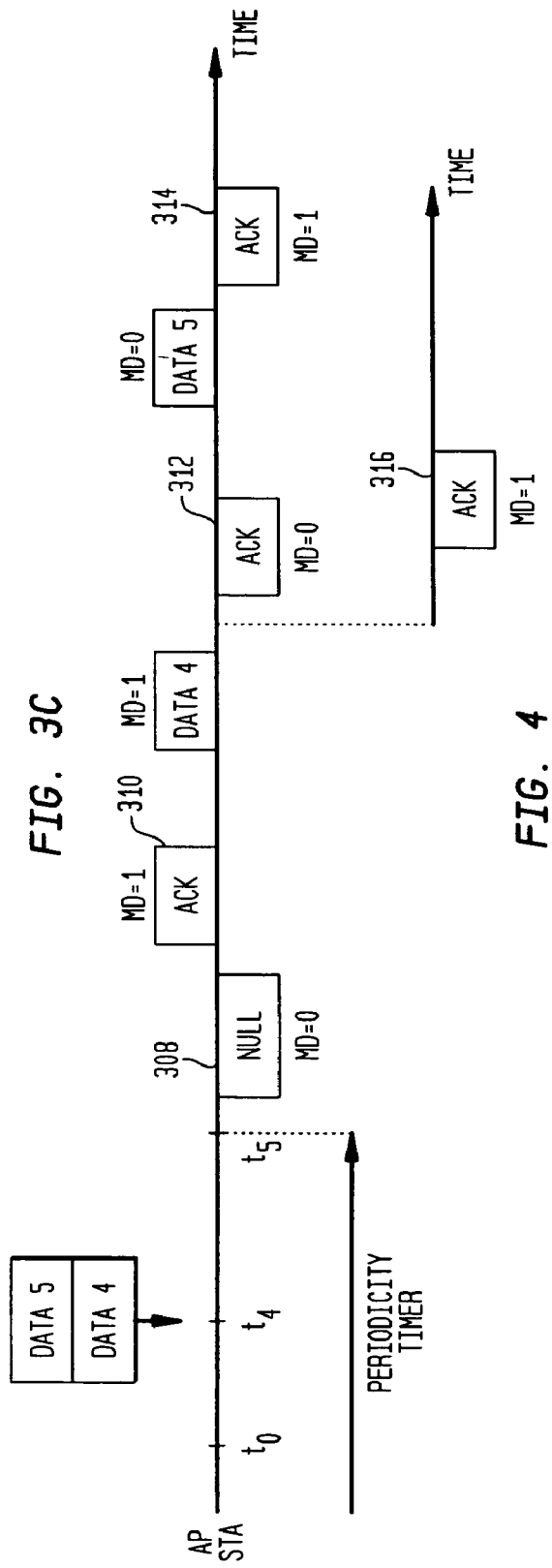

FIGS. 3A-C graphically show how the MD bit is used to manage transmissions between an AP and an STA according to another embodiment of the present invention. More specifically, instead of or in addition to using PS-Poll frames to create deliver opportunities for the AP, the AP and STA create deliver opportunities by entering a new mode of operation, hereafter referred to as interactive traffic power management (ITPM) mode. In ITPM mode, the PS and MD bits are interpreted differently than within the current 802.11 standard specifications. For example, in ITPM mode, the PM bit is ignored and the MD bit is used to manage transitions of the STA between the awake and doze states. As such, the ITPM mode requires an extension of the 802.11 standard. Similar to the method illustrated in FIGS. 2A-C, embodiments of the method illustrated in FIGS. 3A-C spread the traffic load away from beacons and reduce the transmission overhead.

To enter ITPM mode, the STA and AP exchange action frames requesting and confirming said mode. For example, in one configuration, the STA initiates entry into ITPM mode by transmitting a first action frame to the AP. An action frame is a management frame defined in IEEE Draft Standard 802.11e (version D4.0 of November, 2002), the teachings of which are incorporated herein by reference. The body of an action frame has a set of sub-fields, several of which are reserved for future expansions of the standard. According to one embodiment of the present invention, one of the reserved sub-fields is used to initiate or terminate the ITPM mode. More specifically, values of 1 and 0 in the ITPM sub-field correspond to the initiation and termination, respectively, of the ITPM mode. After receiving the first action frame having its ITPM sub-field value set to 1, the AP transmits a second action frame having its ITPM sub-field value also set to 1, which confirms acceptance of the ITPM mode. After this confirmation, the STA transitions into the doze state and the AP begins buffering data frames designated for delivery to the STA. In an alternative configuration, the AP may similarly initiate entry into ITPM mode.

While in ITPM mode, the STA and AP interpret the MD bit as follows. For frames transmitted from the STA to the AP, MD bit values of 1 and 0 indicate to the AP that the STA will be in the doze and awake state, respectively, until further notice. For frames transmitted from the AP to the STA, an MD bit value of 1 indicates that the AP has at least one data frame available for transmission to that STA and that the STA will stay awake until transition to the doze state is confirmed. An MD bit value of 0 indicates that the AP has no data frames for the STA and that the STA may transition to the doze state.

In ITPM mode, either an AP or an STA can create deliver opportunities by appropriately setting the MD bit value in a transmitted frame. In one configuration, the STA runs a periodicity timer starting when the STA transitions to the doze state. When the periodicity timer runs out, the STA transitions to the awake state and notifies the AP that it is now awake by transmitting a Null frame having its MD bit set to 0. Selection of a threshold value for the periodicity timer may be similar to that described above for the method of FIGS. 2A-C.

FIG. 3A shows a representative frame exchange in ITPM mode when both the AP and the STA have data frames available for transmission. Suppose that at time t0 the AP and STA have commenced the ITPM mode and the STA transitioned into the doze state. When at time t1>t0 frame Data 1 becomes available for transmission from the AP to the STA, the AP queues that frame in a buffer without attempting to transmit it to the STA. When at time t2>t1 frame Data 2 becomes available for transmission from the STA to the AP, the STA transitions to the awake state and proceeds to transmit frame Data 2 with the MD bit in its header set to 0. The transmission may occur immediately after frame Data 2 has become available or at a later time, e.g., selected in accordance with a previously negotiated transmission schedule. The AP acknowledges receipt of frame Data 2 with an ACK frame 302 having its MD bit set to 1, which informs the STA that the AP has data and instructs the STA to stay awake. The AP then transmits frame Data 1 with its MD bit set 0, which indicates that the AP has no additional frames to transmit. The STA acknowledges receipt of frame Data 1 with an ACK frame 304 having its MD bit set to 1, transitions to the doze state, and starts the periodicity timer.

FIG. 3B shows a representative frame exchange in ITPM mode when only the STA has data frames available for transmission. Similar to the situation illustrated in FIG. 3A, at time t0 the ITPM mode has started and the STA transitioned into the doze state. When at time t3>t0 frame Data 3 becomes available for transmission from the STA to the AP, the STA transitions to the awake state and proceeds to transmit frame Data 3 with the MD bit in its header set to 0. The AP acknowledges receipt of frame Data 3 with an ACK frame 306 having its MD bit set 0, which indicates that the AP has no frames to transmit. Upon receipt of ACK frame 306, the STA transitions to the doze state and starts the periodicity timer.

FIG. 3C shows a representative frame exchange in ITPM mode when only the AP has data frames available for transmission. Similar to the situations illustrated in FIGS. 3A-B, at time t0 the ITPM mode has started and the STA transitioned into the doze state. When at time t4>t0 frames Data 4 and Data 5 become available for transmission from the AP to the STA, the AP queues those frame in a buffer without attempting to transmit them to the STA. Since the STA has no frames to transmit, it will remain in the doze state until the periodicity timer runs out at time t5>t4. At that point the STA awakes and transmits a Null frame 308 having its MD bit set to 0, which notifies the AP that the STA is now in the awake state. The AP acknowledges receipt of frame 308 with an ACK frame 310 having its MD bit set to 1, which instructs the STA to stay awake. The AP then transmits frame Data 4 having its MD bit set to 1.

The upper time axis in FIG. 3C illustrates a first scenario, in which the STA decides to accept further transmissions from the AP. Accordingly, the STA acknowledges receipt of frame Data 4 with an ACK frame 312 having its MD bit set to 0. The AP then transmits frame Data 5 having its MD bit set to 0, indicating that further frames are not yet available. The STA acknowledges receipt of frame Data 5 with an ACK frame 314 having its MD bit set to 1, transitions to the doze state, and starts the periodicity timer. The lower time axis in FIG. 3C illustrates a second scenario, in which the STA decides to interrupt further transmissions from the AP. A possible reason for the interruption can be, for example, a limitation in the particular STA embodiment that imposes a restriction on the length of time for the continuous (uninterrupted) use of full awake power. Accordingly, the STA transmits an ACK frame 316 having its MD bit set to 1. After the transmission of frame 316, the STA is allowed to transition to the doze state and start the periodicity timer.

Similar to embodiments of the power management method illustrated in FIGS. 2A-C, ITPM mode is particularly advantageous when the traffic load is such that data frames become available for transmission both at the STA and AP at relatively regular intervals, which is typically the case for interactive voice-over-WLAN applications. Using the MD bit, the STA can offer a deliver opportunity and the AP can accept or deny that opportunity. As a result, frame delivery is decoupled from the beacon schedule. In addition, both upstream and downstream frames can be delivered using the same deliver opportunity, which reduces the transmission overhead.

Figure 4:
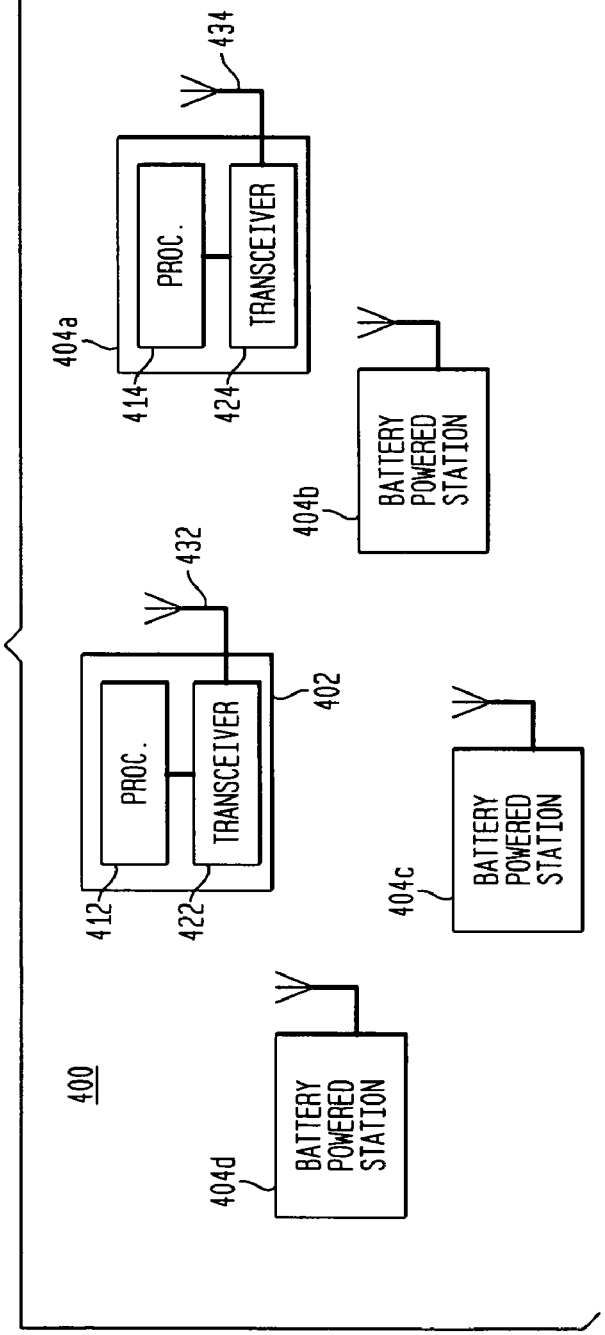
FIG. 4 shows a block diagram of a WLAN system in which the methods illustrated in FIGS. 2-3 may be practiced.

FIG. 4 shows a block diagram of a WLAN system 400 in which embodiments of the method illustrated in FIGS. 2-3 may be practiced. System 400 has an AP 402 and four battery-powered STAs 404*a-d*. Each STA 404 is adapted to operate in the awake and doze states. Each STA 404 comprises a processor, a transceiver, and an antenna. For example, STA 404*a* has a processor 414, a transceiver 424, and an antenna 434. Similarly, AP 402 comprises a processor 412, a transceiver 422, and an antenna 432. Each STA 404 transitions between the awake and doze states in accordance with a selected embodiment of the present invention or as specified in the 802.11 standard and exchanges frames with AP 402 using the corresponding procedure. The operation of each STA 404 and AP 402 is controlled by the corresponding processor executing software or firmware instructions corresponding to the selected power management scheme.

While this invention has been described with reference to illustrative embodiments, this description is not intended to be construed in a limiting sense. Although the invention was described in reference to PM and MD bits, the invention may also be adapted to utilize other bits of the MAC header. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. At a station of a contention-based WLAN system in which the station is adapted to operate in awake and doze states, a method comprising:
(A) with the station in the doze state, transitioning the station from the doze state to the awake state; and
(B) transmitting to an access point (AP) of the system a first frame, wherein a designated bit in the first frame informs the AP that the station will remain in the awake state and be available to receive at least one transmission from the AP, wherein:
step (A) comprises:
starting a timer when the station has transitioned into the doze state; and
if there is no data available for transmission from the station to the AP, then transitioning the station from the doze state to the awake state when the timer reaches a threshold value; and
step (B) is performed after the station has transitioned to the awake state due to the timer reaching the threshold value but before the station receives a next frame from the AP; and
(C) receiving from the AP an acknowledgment frame corresponding to the first frame, wherein:
a more data bit of an IEEE 802.11 standard in the acknowledgment frame informs the station whether the AP has data to transmit to the station;
if the more data bit indicates that the AP has the data, then the method comprises (D1) keeping the station in the awake state and available to receive from the AP at least one frame corresponding to the data; and if the more data bit indicates that the AP does not have the data, then the method comprises (D2) transitioning the station to the doze state upon receipt of the acknowledgment frame.

2. The method of claim 1, wherein the contention-based WLAN system conforms to an IEEE 802.11 standard.

3. The method of claim 1, wherein the contention-based WLAN system conforms to an extension of an IEEE 802.11 standard.

4. The method of claim 1, wherein steps (A) and (B) are performed independent of any beacon schedule for the system.

5. The method of claim 1, wherein:
step (A) further comprises:
if data has become available for transmission from the station to the AP, then transitioning the station to the awake state upon said availability; and
for step (B), the first frame corresponds to the data.

6. The method of claim 1, wherein:
for step (B), the first frame is a null frame.

7. The method of claim 6, wherein the threshold value is less than an inter-beacon time interval.

8. The method of claim 1, wherein the designated bit is a power management bit of an IEEE 802.11 standard.

9. The method of claim 1, wherein the designated bit is a more data bit of an IEEE 802.11 standard.

10. The method of claim 1, further comprising:
(E) with the station in the awake state and the AP informed that the station is in the awake state, transmitting to the AP a closing frame, wherein a designated bit in the closing frame informs the AP that the station will transition to the doze state; and
(F) transitioning the station from the awake state to the doze state.

11. At an access point (AP) of a contention-based WLAN system in which a station is adapted to operate in awake and doze states, a method comprising:
(A) receiving from the station a first frame, wherein a more data bit of an IEEE 802.11 standard in the first frame informs the AP that the station will remain in the awake state and be available to receive at least one transmission from the AP; and
(B) transmitting to the station an acknowledgment frame corresponding to the first frame, wherein a designated bit in the acknowledgment frame informs the station whether the AP has data to transmit to the station, wherein:
the contention-based WLAN system conforms to an extension of the IEEE 802.11 standard;
the designated bit is a more data bit of the IEEE 802.11 standard; and
if the designated bit indicates that the AP has the data, then the method comprises transmitting to the station at least one frame corresponding to the data, wherein the station continues to remain in the awake state to be available to receive said at least one frame.

12. The method of claim 11, wherein steps (A) and (B) are performed independent of any beacon schedule for the system.

13. The method of claim 11, wherein:
when data is available for transmission from the station to the AP, the first frame corresponds to the data; and
when there is no data available for transmission from the station to the AP, the first frame is a null frame.

14. A station in a contention-based WLAN system, the station adapted to operate in awake and doze states and comprising:
(A) a processor, wherein, with the station in the doze state, the processor configures the station to transition from the doze state to the awake state; and
(B) a transceiver, wherein the processor configures the transceiver to transmit to an access point (AP) of the system a first frame, wherein a designated bit in the first frame informs the AP that the station will remain in the awake state and be available to receive at least one transmission from the AP, wherein:
the processor is adapted to:
start a timer when the station has transitioned into the doze state; and
if there is no data available for transmission from the station to the AP, then configure the station to transition from the doze state to the awake state when the timer reaches a threshold value; and
the first frame is transmitted after the station has transitioned to the awake state due to the timer reaching the threshold value but before the station receives a next frame from the AP, wherein:
the processor configures the transceiver to receiving from the AP an acknowledgment frame corresponding to the first frame;
a more data bit of an IEEE 802.11 standard in the acknowledgment frame informs the station whether the AP has data to transmit to the station;
if the more data bit indicates that the AP has the data, then the processor configures the station to remain in the awake state to be available to receive from the AP at least one frame corresponding to the data; and
if the more data bit indicates that the AP does not have the data, then the processor configures the station to transition to the doze state upon receipt of the acknowledgment frame.

15. An access point (AP) of a contention-based WLAN system in which a station is adapted to operate in awake and doze states, the AP comprising a processor and a transceiver, wherein the processor configures the transceiver:
(A) to receive from the station a first frame, wherein a more data bit of an IEEE 802.11 standard in the first frame informs the AP that the station will remain in the awake state and be available to receive at least one transmission from the AP; and
(B) to transmit to the station an acknowledgment frame corresponding to the first frame, wherein a designated bit in the acknowledgment frame informs the station whether the AP has data to transmit to the station, wherein:
the designated bit is a more data bit of the IEEE 802.11 standard; and
if the designated bit indicates that the AP has the data, then the processor configures the transceiver to transmit to the station at least one frame corresponding to the data, wherein the station continues to remain in the awake state to be available to receive said at least one frame.

* * * * *